Mar. 27, 1923.
H. KING
1,449,861
FURNACE REGULATOR SYSTEM
Filed Dec. 13, 1919
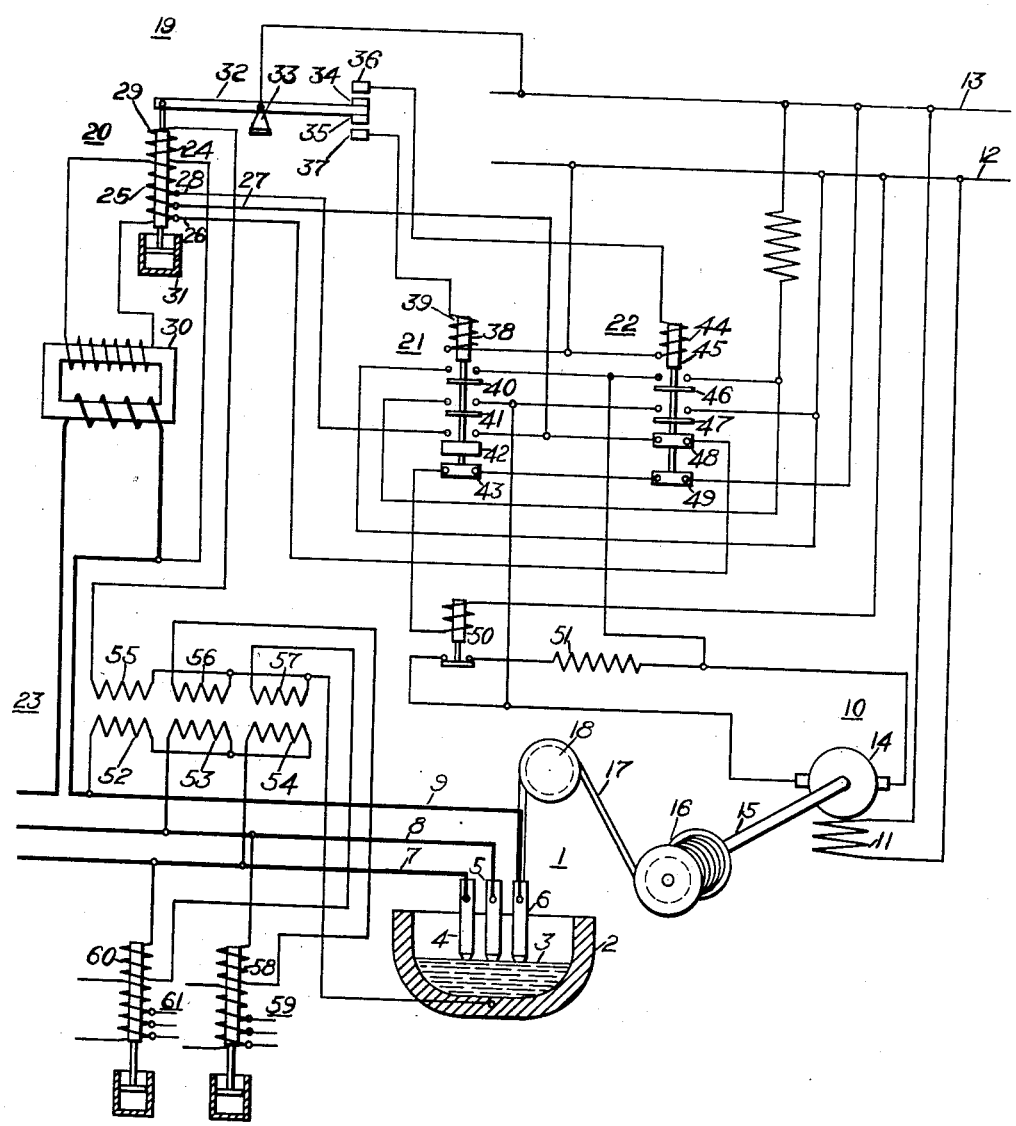
WITNESSES:
J. B. Merrill
W. B. Wells.
INVENTOR
Harvey King
BY
Wesley G. Carr
ATTORNEY Patented Mar. 27, 1923.

1,449,861

UNITED STATES PATENT OFFICE.

HARVEY KING, OF WILKINSBURG, PENNSYLVANIA, ASSIGNOR TO WESTINGHOUSE ELECTRIC & MANUFACTURING COMPANY, A CORPORATION OF PENNSYLVANIA.

FURNACE-REGULATOR SYSTEM.

Application filed December 13, 1919. Serial No. 344,625.

*To all whom it may concern:*

Be it known that I, HARVEY KING, a citizen of the United States, and a resident of Wilkinsburg, in the county of Allegheny and State of Pennsylvania, have invented a new and useful Improvement in Furnace-Regulator Systems, of which the following is a specification.

My invention relates to regulator systems and particularly to furnace-regulator systems for governing the operation of the movable electrodes in electric furnaces.

One object of my invention is to provide a furnace-regulator system that shall govern the operation of the movable electrodes in accordance with the current and the voltage conditions of the electrode circuit and that shall be provided with means for preventing hunting action.

In operating an electric furnace of the movable-electrode type, it is practically essential to provide some automatic means for adjusting the movable electrodes in order to maintain constant electrode arcs. It is, at present, customary to accomplish such function by providing each electrode with a regulator which is controlled in accordance with the current flowing through the electrode. Such regulation is objectionable in some cases inasmuch as no specific account is taken of the power supplied to each electrode or of the potential across the electrode arc. Thus, in a furnace having the movable electrodes thereof controlled solely in accordance with the current flowing through the electrodes, it is apparent that, although the various electrodes are adjusted to have like amounts of current flowing through them, it is possible to produce entirely different heating effects by reason of the different potentials across the different electrode arcs.

In a furnace-regulator system embodying my invention, each movable electrode is raised and lowered by an electric motor and each electrode motor is controlled by a regulator to maintain a constant electrode arc. Each regulator comprises an electromagnet having a current winding which is energized in accordance with the current flowing through the associated electrode and a potential winding which is energized under the control of an inductive device. The inductive device comprises a number of windings which are connected across the supply circuit and, in case of a three-phase circuit, it is preferable to connect the windings in star arrangement across the supply circuit. A plurality of windings are connected across the electrode arcs and are inductively associated with the windings connected across the supply circuit to oppose the action of such windings. The potential windings of the regulator electromagnets are respectively connected in series with the windings connected across the electrode arcs.

Thus each electrode motor is operated to control the associated electrode in accordance with the current and the voltage conditions of the electrode circuit so that equal heating effects shall be produced by the various electrodes. The inductive device effects the energization of each potential winding of the regulators so that current flows through each potential winding to assist or to oppose the action of the associated current winding according to the condition of the electrode circuit.

The single figure of the accompanying drawing is a diagrammatic view of a furnace-regulator system embodying my invention.

Referring to the drawing, an electric furnace 1, comprising a receptacle 2, containing a bath of material 3 and three movable electrodes 4, 5 and 6, is directly connected to a three-phase supply circuit comprising conductors 7, 8 and 9.

Each of the electrodes 4, 5 and 6 is provided with a motor for raising and lowering it and a regulator for governing the motor in accordance with the voltage and current conditions obtaining in the electrode circuit. Inasmuch as each of the electrode motors and the regulators are similar in construction and operation, it is deemed sufficient to describe and illustrate but one electrode motor and one regulator, namely, the motor and the regulator which is associated with the movable electrode 6.

A motor 10, comprising a field winding 11, which is connected across an auxiliary supply circuit comprising conductors 12 and 13, and an armature 14, is provided for raising and lowering the electrode 6. The armature 14 of the motor 10 is mechanically connected to the electrode 6 in any suitable manner, as by means of a shaft 15, a winding drum 16 and a flexible connector 17 which passes over a pulley 18.

The motor 10 is controlled by means of a regulator 19, comprising a main control electromagnet 20, two switches 21 and 22 which are controlled by the main control electromagnet 20, and an inductive device 23 which effects operation of the main control magnet 20 under certain conditions. The main control electromagnet 20 comprises a potential winding 24 which is connected to the device 23, a current winding 25 having three taps 26, 27 and 28 extending from it, for a purpose to be set forth hereinafter, and a core armature 29. The current winding 25 is connected to the three-phase supply conductor 9 by means of a current transformer 30 in order to be energized in accordance with the current flowing through the electrode 6. The core armature 29 is provided with a dash pot 31 for governing its speed of operation and is pivotally connected to a contact arm 32. The winding 24 is wound in a direction to oppose the action of the winding 25.

The contact arm 32 is fulcrumed at 33 and is provided with two main contact members 34 and 35 which are disposed near the end opposite to the connection of the core armature 29. The main contact members 34 and 35, respectively, engage contact members 36 and 37 according to the position of the contact arm 32.

The switch 21 comprises a winding 38, which is connected across the supply conductors 12 and 13, upon engagement between the two main contact members 35 and 37, and a core armature 39 which operates two switch members 40 and 41 and two interlock switch members 42 and 43. The two switch members 40 and 41, upon operation of the switch 21, connect the armature 14 across the supply conductors 12 and 13 for operating the motor 10 in a counter-clockwise direction. The counter-clockwise rotation of the motor 10 raises the electrode 6 from the bath of material 3 to decrease the current flow through the electrode and to increase the potential obtaining across the electrode arc. The interlock switch member 42, upon operation of the switch 21, serves to short-circuit that portion of the current winding 25 which is included between the taps 27 and 28 to prevent any hunting action by the regulator during counter-clockwise rotation of the motor.

The switch 22 comprises a winding 44, which is connected across the supply conductors 12 and 13 upon engagement between the main contact members 34 and 36, and a core armature 45, which operates two switch members 46 and 47 and two interlock switches 48 and 49. The two switches 46 and 47 serve to connect the armature 14 across the supply conductors 12 and 13 to rotate the motor 10 in a clockwise direction. The clockwise rotation of the motor lowers the electrode 6 into the furnace 1 in order to increase the current flow through the electrode and decrease the potential obtaining across the electrode arc. The interlock switch member 48, upon operation of the switch 22, serves to open a short-circuit normally obtaining across that portion of the current winding 25 which is included between the taps 26 and 27 in order to prevent any hunting action by the regulator when the electrode is being lowered in the furnace.

The interlock switch members 43 and 49, upon de-energization of the switches 21 and 22, serve to connect a brake relay 50 across the supply conductors 12 and 13. The relay 50, upon operation, completes a dynamic-braking circuit for the armature 14 through a resistor 51. Thus, it is apparent that, when the motor 10 is being operated in a clockwise or in a counter-clockwise direction and is de-energized by releasing one of the switches 21 and 22, the brake relay 50 is immediately energized to complete a dynamic-braking circuit and effect a quick stopping of the motor.

The inductive device 23 comprises windings 52, 53 and 54 which are preferably connected in star relation across the three-phase supply circuit comprising conductors 7, 8 and 9. Three windings 55, 56 and 57 are respectively connected across the arcs produced by the electrodes 6, 5 and 4 and are inductively associated with the windings 52, 53 and 54 to oppose the action of such windings. The winding 55 is connected in series with the potential winding 24 of the main control magnet 20. The winding 56 is connected in series with the potential winding 58 of an electromagnet 59 comprising a part of a regulator which governs the operation of the electrode 5. The winding 57 is connected in series with the potential winding 60 of an electromagnet 61 which comprises a part of the regulator which governs the operation of the electrode 4.

Thus, it is apparent that the windings 55 and 52 have a differential effect for controlling the energization of the potential winding 24 to assist or to oppose the current winding 25 of the electromagnet 20 in order to operate the regulator in accordance with the potential obtaining across the arc produced by the electrode 6. In a similar manner, the windings 56 and 53 and the windings 57 and 54 effect the operation of the regulator associated with the electrodes 5 and 6 in accordance with the potential obtaining across the arcs produced by the electrodes 5 and 4.

Assuming the apparatus of the system to be in the position shown, an increased current to flow through the electrode 6 and a potential below normal value to be produced across the arc of the electrode 6, then the energization of the current winding 25 will be increased above normal value and the energization of the potential winding 24 will be decreased below normal value. Inasmuch as the winding 24 opposes the energization of the winding 25, the above-mentioned changes in the energization of the two windings causes an increase in the strength of the electromagnet 20. Thereupon, the electromagnet 20 operates the contact arm 32 to effect engagement between the contact members 35 and 37. Upon engagement of the contact members 35 and 37, a circuit is completed from the supply conductor 13 through the contact arm 32, contact members 35 and 37 and the winding 38 of the switch 21 to the supply conductor 12. The switch members 40 and 41 complete a circuit for the armature 14 and effect rotation of the motor 10 in counter-clockwise direction to raise the electrode 6 from the bath of material 3. Thereupon, the current flow through the electrode 6 is decreased and the potential obtaining across the electrode arc is increased.

In case the electromagnet 20 were controlled solely by the electrode-circuit conditions, then the electromagnet would not be operated to stop the motor 10 until the current flow through the electrode 6 was reduced to a normal amount and the potential across the electrode arc was raised to normal value. Such operation of the regulator is impractical, inasmuch as the inertia of the various moving parts of the system would over-compensate the movement of the electrode.

In order to prevent such overtravel and the resulting hunting action, the setting of the regulator is changed by the interlock switch member 42 which decreases the energization of the current winding 25. Thus, just prior to the obtaining of normal electrode-circuit conditions, the electromagnet 20 operates the contact arm 32 to separate the contact members 35 and 37 and de-energize the motor 10 so that overtravel of the various moving parts is prevented.

In case a current below a normal amount flows through the electrode 6 and a potential above normal value is produced across the electrode arc, the contact arm 22 is operated to effect engagement between the contact members 34 and 36. Thereupon, a circuit is completed from the supply conductors 13 through contact arm 32, switch members 34 and 36 and the winding 44 of the switch 22 to the supply conductor 12. The switch members 46 and 47 connect the armature 14 across the supply conductors 12 and 13, and the motor is operated in a clockwise direction to lower the electrode 6 in the furnace 1. Thus, the current flow through the electrode 6 is increased and the potential across the electrode arc is decreased.

During the operation of the motor 10 in a clockwise direction, the setting of the regulator 19 is changed by the interlock switch member 48 in order to prevent any hunting action. The interlock switch member 48 opens the short-circuit normally obtaining across that portion of the current winding 25 which is included between the taps 26 and 27 so that the energization of the winding 25 is increased, and separation of the contact members 34 and 36 is obtained just prior to the raising of the current flow through the electrode 6 to a normal amount and the decreasing of the potential across the electrode arc to a normal value.

Cross reference is made herein to the application of Robert D. Evans, Serial No. 258,365, filed Oct. 16, 1918, and assigned to the Westinghouse Electric & Manufacturing Company.

Modifications in the system and arrangement and location of parts may be made within the spirit and scope of my invention, and such modifications are intended to be covered by the appended claims.

I claim as my invention:

1. In a regulator system, the combination comprising a supply circuit, a movable electrode connected to the supply circuit, and a regulator for governing the operation of the electrode, said regulator comprising an auxiliary winding connected across the supply circuit, a second auxiliary winding connected across the electrode arc and inductively connected to oppose the action of said first winding, and a main control magnet having a winding energized in accordance with current flowing through the electrode and a second winding energized in accordance with the energization of said auxiliary windings.

2. In a regulator system, the combination comprising a supply circuit, a movable electrode connected to the supply circuit, and a regulator for governing the operation of the electrode to maintain a constant electrode arc, said regulator comprising an electromagnet having a current winding energized in accordance with the current flowing through the electrode, a potential winding, an auxiliary winding connected across the supply circuit, a second auxiliary winding connected across the electrode arc, and means for energizing said potential winding in accordance with the difference in energization between said auxiliary windings.

3. In a regulator system, the combination with a supply circuit, and a movable electrode connected to the supply circuit, of an electromagnet having a current winding energized in accordance with the current flowing through the electrode and a potential winding, an inductive device having differential windings respectively energized in accordance with the supply-circuit voltage and in accordance with the potential obtaining across the electrode arc, said inductive device effecting the energization of said potential winding, and means controlled by said electromagnet for governing the operation of said electrode to maintain a constant electrode arc.

4. In a regulator system, the combination comprising a supply circuit, a movable electrode connected to the supply circuit, and a regulator for governing the operation of the electrode to maintain a constant electrode arc, said regulator comprising a winding energized in accordance with the current flowing through the electrode, a potential winding, and means for energizing said potential winding in accordance with the potential across the electrode arc and comprising differential coils respectively energized in accordance with the supply-circuit voltage and the potential across the electrode arc.

5. In a regulator system, the combination with a movable electrode, and means for raising and lowering said electrode, of a regulator for controlling said means and comprising a potential winding, and an inductive device having differential windings respectively energized in accordance with the supply-circuit voltage and in accordance with the potential across the electrode arc for energizing said potential winding.

6. In a furnace-regulator system, the combination with a three-phase supply circuit, and three movable electrodes connected to said supply circuit, of a regulator associated with each electrode for governing its operation to maintain a constant electrode arc, each of said regulators comprising an electromagnet having a current winding energized in accordance with the current flowing through the electrode and a potential winding, and an inductive device comprising windings star-connected across the supply circuit and windings connected across the various electrode arcs to oppose the action of the star-connected windings, said inductive device serving to energize the potential windings of the various regulators.

7. In a furnace regulator system, the combination with a supply circuit and a movable electrode connected to the supply circuit, of a regulator for governing the operation of the electrode to maintain a constant electrode arc, said regulator comprising an electromagnet having a potential winding and an inductive device for energizing said winding, said inductive device comprising two differential windings, one of said differential windings being connected across the supply circuit and the second differential winding being connected across the electrode arc and in series with said potential winding.

8. In a furnace-regulator system, the combination with a three-phase supply circuit, three movable electrodes connected to the supply circuit, and three motors for raising and lowering the electrodes, of regulators for governing the operation of the motors to maintain constant electrode arcs, each of said regulators comprising an electromagnet having a current winding energized in accordance with the current flowing through the associated electrode and a potential winding, and an inductive device comprising windings star-connected across the supply circuit and windings connected across the various electrode arcs to oppose the star-connected windings and in series respectively with said potential windings.

9. In a furnace-regulator system, the combination with a supply circuit and a movable electrode, of means comprising a regulator for governing the operation of the electrode to maintain a constant electrode arc, said regulator comprising an electromagnet having a current winding energized in accordance with the current flowing through the electrode and a potential winding; an inductive device for energizing said potential winding, said inductive device comprising differential windings, one of said differential windings being connected across the supply circuit and a second differential winding being connected across the electrode arc and in series with said potential winding, and means for varying the energization of the current winding to prevent hunting action.

In testimony whereof, I have hereunto subscribed my name this 25th day of November, 1919.

HARVEY KING.